United States Patent [19]
Kellström et al.

[11] Patent Number: 6,033,122
[45] Date of Patent: Mar. 7, 2000

[54] METHOD FOR CLEARANCE ADJUSTMENT IN A ROLLING BEARING

[75] Inventors: Magnus Kellström, Ensittarevägen; Jonas Kullin, Bårekulla, both of Sweden

[73] Assignee: Aktiebolaget SKF, Gothenburg, Sweden

[21] Appl. No.: 08/930,451

[22] PCT Filed: Mar. 22, 1996

[86] PCT No.: PCT/SE96/00362

§ 371 Date: Jan. 12, 1998

§ 102(e) Date: Jan. 12, 1998

[87] PCT Pub. No.: WO96/30662

PCT Pub. Date: Oct. 3, 1996

[30] Foreign Application Priority Data

Mar. 31, 1995 [SE] Sweden ................................. 9501179

[51] Int. Cl.[7] ....................................................... F16C 23/08
[52] U.S. Cl. ............................ 384/563; 384/568; 384/571
[58] Field of Search ................................. 384/563, 568, 384/517, 518, 565, 571

[56] References Cited

U.S. PATENT DOCUMENTS 1,280,664 10/1918 Clark .
3,306,687 2/1967 Smith .
3,370,900 2/1968 Messerschmidt .
3,934,957 1/1976 Derner ..................................... 384/563
3,957,319 5/1976 Gorski ..................................... 384/563

FOREIGN PATENT DOCUMENTS 423231 11/1910 France .
61-274116 12/1986 Japan .
449908 5/1987 Sweden .
356319 9/1961 Switzerland .
606844 11/1978 Switzerland .

*Primary Examiner*—Lenard A. Footland
*Attorney, Agent, or Firm*—Burns, Doane, Swecker & Mathis, L.L.P.

[57] ABSTRACT

The present invention refers to a method for clearance adjustment in a rolling bearing having an angle of contact close to 0°, and of the type incorporating a number of rollers provided between and in contact with two race tracks, said rollers and race tracks having longitudinal section profiles of essentially the same radii of curvature, said rollers thereby being axially movable along the race tracks without being hindred by axial limitations at the race tracks, in order to allow relative misalignment and axial displaceability of the race tracks.

18 Claims, 5 Drawing Sheets

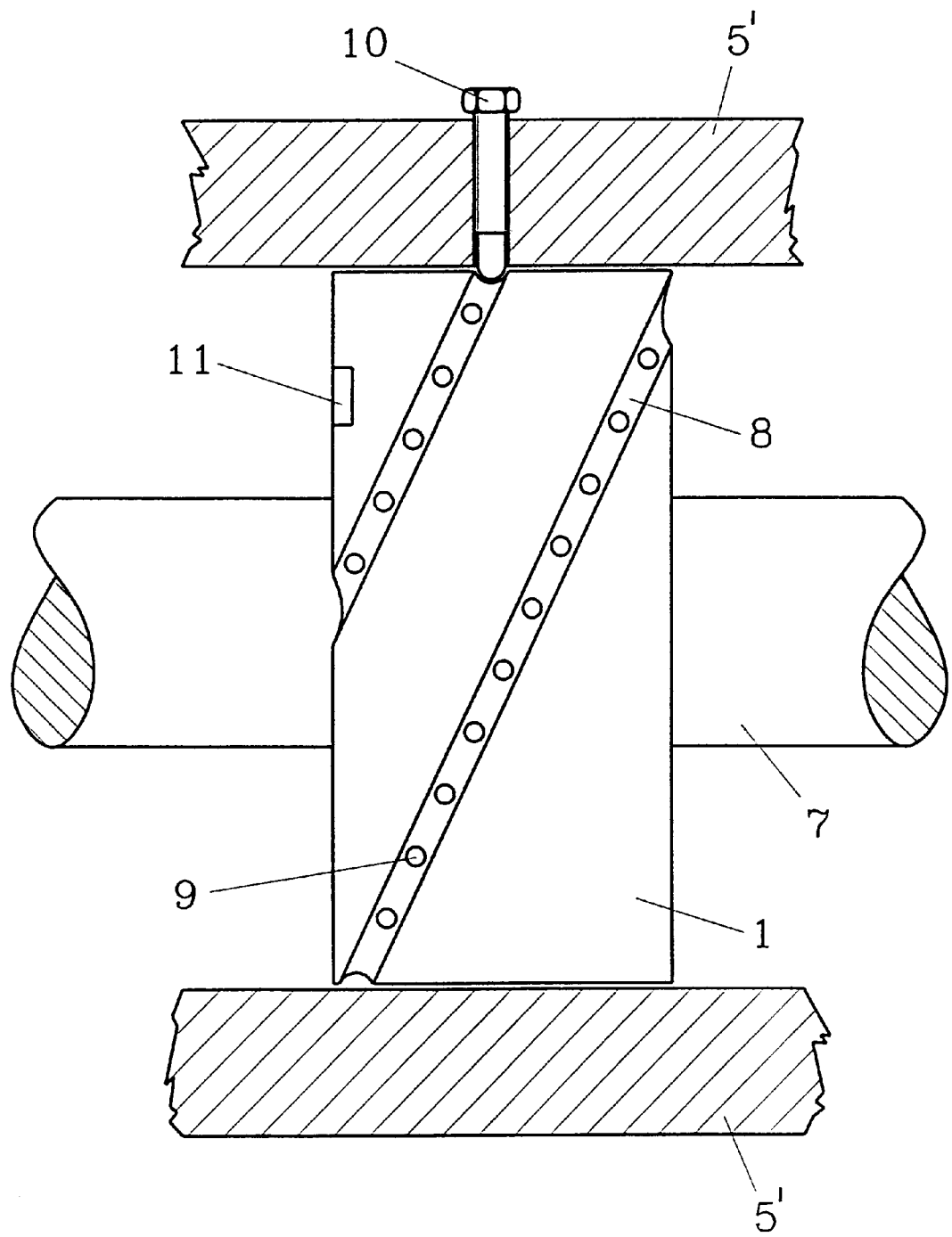

METHOD FOR CLEARANCE ADJUSTMENT IN A ROLLING BEARING

The present invention refers to a method for clearance adjustment in a rolling bearing having an angle of contact close to 0°, and of the type incorporating a number of rollers provided between and in contact with two race tracks, said rollers and race tracks having longitudinal section profiles of essentially the same radii of curvature, said rollers thereby being axially movable along the race tracks without being hindred by axial limitations at the race tracks, in order to allow relative misalignment and axial displaceability of the race tracks.

The method can be applied to any adjustable bearings having a contact angle of or close to 0°, e.g. to spherical roller bearings, but it is particularly favourable at bearings where the radius of curvature of the longitudinal section profiles of said roller and race track is bigger than the distance between the outer race track and and the axis of the bearing, as measured perpendicularly to the race track. The contact angle at bearings of the last-mentioned type is altered to such a small extent as compared to spherical bearings when subjected to axial adjustment that the axial load component is not worth mentioning.

Bearings of the last-mentioned type are known e.g. from EPB1-0175858, and they combine different advantages from other types of bearings, such as axial freedom as a cylindrical roller bearing, self alignment as a spherical roller bearing and low section height as a needle roller bearing.

The life and stiffness of a bearing is extensively dependent on the radial internal clearance of the bearing, and it therefore is desirable to optimize the internal clearance for obtaining an optimized life and stiffness.

Conventional rolling bearings are generally delivered with different internal clearances, which is dependent of the specific application for which the bearing is intended. With regard to the field of application it is necessary for the bearing to have either a positive or negative operational clearance, which in some instances is achieved during mounting, e.g. for angular contact bearings and taper roller bearings. It is also possible to provide bearings with specially made bearing rings, which during manufacture are matched to produce a predetermined positive or negative clearance or preload value after mounting. This of course means that an extensive number of different bearings with different internal clearance must be kept in stock.

The purpose of the present invention is to provide a method for clearance adjustment at bearings of the type referred to manufactured to have a reduced number of internal clearances, by which method it is possible to obtain an extensive range of clearance classes with efficient and simple steps, thereby reducing the requirement of keeping a big stock of bearings having different predetermined internal clearance.

In a bearing of the type now referred to, this adjustment of the operational clearance is achieved according to the present invention by actively displacing the inner and outer race rings axially relative to each other.

In a first embodiment of the invention one of the race rings of the bearing is manufactured with its centre displaced from the central position at half the distance between the ends of the rings. When such an unsymmetrical race ring in a first relation is displaced axially in one direction, the clearance is altered either to become greater or smaller, and by turning said one ring in reversed direction, the same direction of axial displacement will result in the same clearance adjustment but in reversed order, i.e. instead of becoming greater, the clearance will become smaller and vice versa. The same effect of course could be achieved by turning around the entire bearing at mounting, but this is not possible in cases where e.g. the inner race ring has a taper bore.

In another embodiment according to the invention both race rings of the bearing are manufactured with their centres displaced from the central position at half the distance between the ends of the rings. When mounting such a ring in a first relation the clearance can be big, and by turning one of said rings in reverse direction it is possible to obtain another, much smaller clearance, whereby the single bearing by means of a simple turning around of one ring at assembly can cover two different clearance classes.

According to a further embodiment of the invention such axial displacement can be further achieved by using separate spacer washers, which are positioned against the end face of one of the rings. By moving at least one such spacer washer to the opposite end face of the same race ring it is further possible to adjust the bearing clearance to cover two different clearance classes.

According to a still another embodiment of the application it is possible to use split bearing housings having a bearing seat disposed in a non-centered position in the removable half of the bearing housing. By positioning the removable bearing housing half in oppositely reversed directions the bearing received in the bearing housing can be given two different internal clearances. In this case it is of course necessary that opposite half of the bearing housing has a free adjustment space for the axially movable bearing ring.

Furthermore it is possible to combine the first embodiment as mentioned hereabove with anyone of the second and third embodiments as mentioned, thereby making it possible to achieve up to eight different clearances in a single bearing, when using e.g. the spacing washers according to the second embodiment on both race rings.

In still another embodiment it is possible cause an incremental displacement of one of the race rings by providing said race ring with a guiding means extending helically along the envelope surface of the race ring opposed to the race track in the ring, providing means projecting from a fixed position in the confronting surface of the bearing housing or the shaft and arranged to engage said guiding means, rotating said race ring relative to said housing and/or shaft, thereby causing axial displacement of the race ring, as a result of cooperation between said helical guiding means and said projecting means.

Hereinafter the invention will be further illustrated with reference to the accompanying drawings, showing schematically the different embodiments of the invention.

FIGS. 4a and 4b show the upper, removable half of a split bearing housing having the removable bearing house half provided with a non-centered bearing seat, the removable bearing house half being turned around in opposite axial direction in FIG. 4b as compared to the position of FIG. 4a.

FIG. 5 illustrates in a section through a bearing housing a preferred arrangement for axial adjustment and arresting of the outer race ring in the housing.

Figure 1:
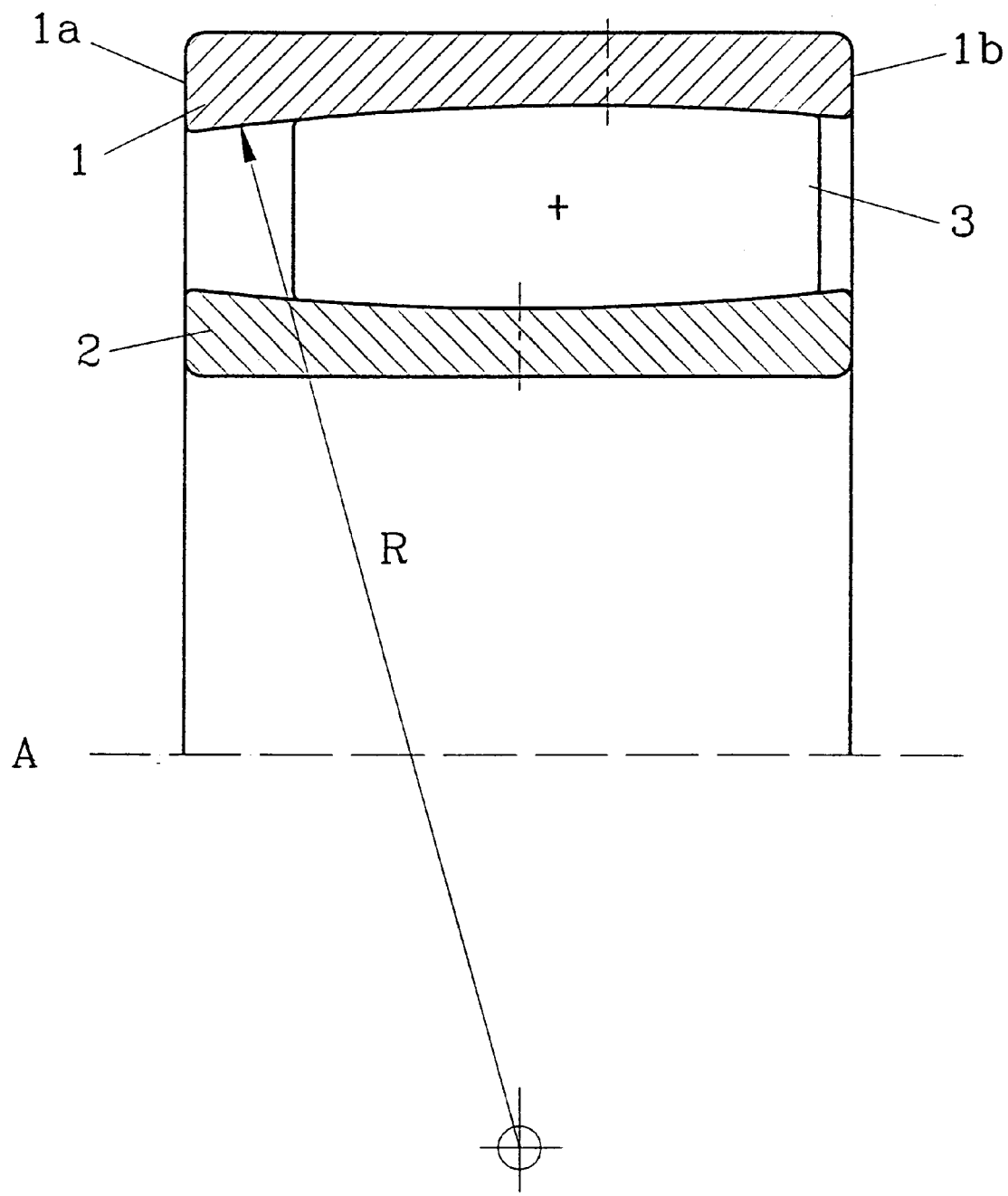
FIG. 1 illustrates a bearing of the type concerned and having one race ring with displaced centre.

In FIG. 1 is schematically illustrated a roller bearing of the type referred to in the preamble. The bearing comprises an outer race ring 1 having an inner race track, an inner race ring 2 having an outer race track and rollers 3 disposed between said outer and inner race tracks. The curvatures of the race tracks and of the rollers are substantially equal and have a radius R, which in the embodiment illustrated is substantially bigger than the mean radius of the bearing.

The centre of the outer race ring 1 in this embodiment is displaced axially thus that it is situated offset from the geometrical center of the ring, resulting in an unsymmetric ring. The outer race ring 1 thus has side faces 1a and 1b of different heights.

With this embodiment of the invention it is possible to compensate for expansion, whereby displacement when the rings are arranged in the relation shown in FIG. 1 will give a certain compensation in one direction, whereas a simple turning around of the outer race ring 1, thus that side face 1a and side face 1b change place, will result in a possibility of obtaining a compensation of equal size, but in the opposite direction.

Figure 2A:
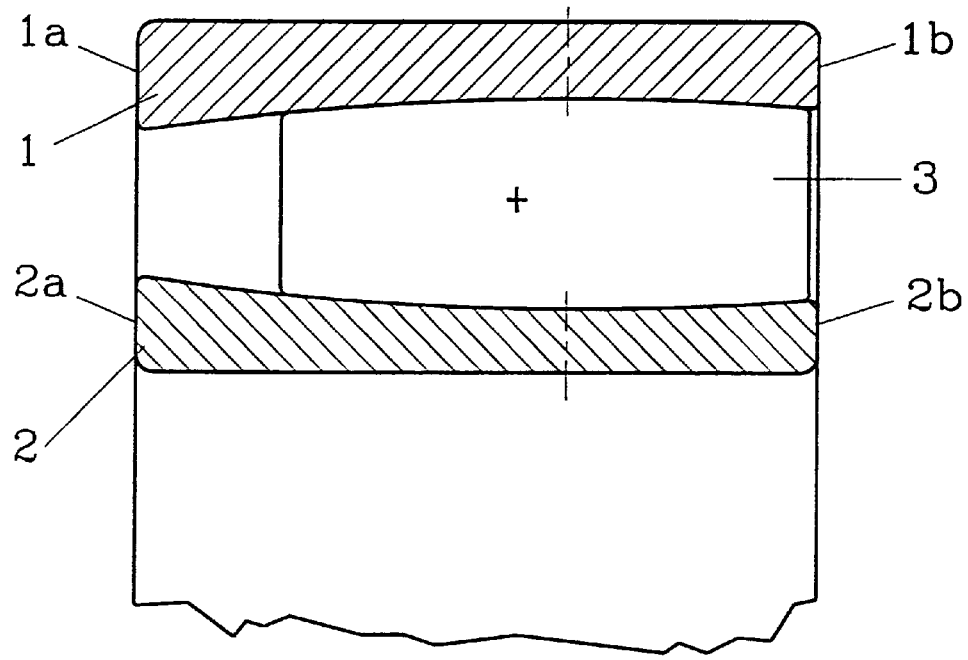
FIG. 2a illustrates a bearing of the type concerned wherein both race rings have displaced centres.
Figure 2B:
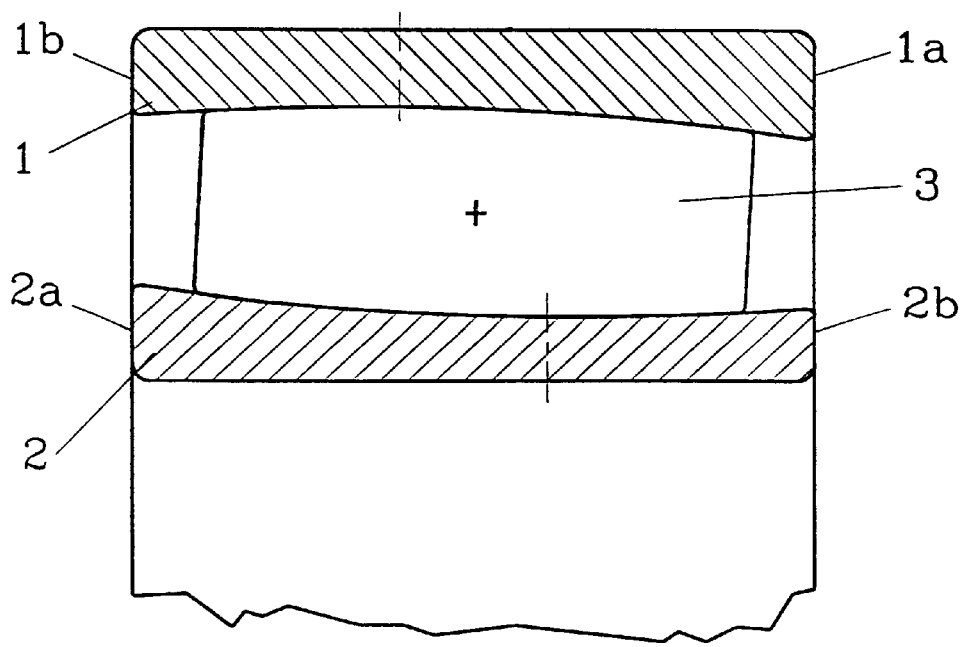
FIG. 2b shows the bearing according to FIG. 2a wherein the inner race ring has been turned around in opposite axial direction.

In FIGS. 2a and 2b is schematically illustrated another embodiment according to the invention, wherein the centres of both race rings 1, 2 are displaced axially thus that they are situated offset from the geometrical centers of the rings, resulting in unsymmetric rings. The outer race ring 1 thus has end faces 1a and 1b and the inner race ring 2 side faces 2a and 2b of different heights. With this embodiment of the invention it is possible to alter the internal clearance of the bearing by turning one of the rings in opposite axial direction. In this manner it is achieved a possibility to allow a single bearing to cover two different clearance classes, i.e. when the bearing race rings are positioned with their resp. centre aligned.

When the outer race ring 1 is positioned in one axial direction, having its higher section end face 1a turned in one axial direction as in FIG. 2a, the bearing has its greatest internal radial clearance, whereas it when the outer race ring is turned 180° with its bigger end face section in the opposite axial direction such as shown in FIG. 2b, the clearance is at its smallest.

Figure 3A:
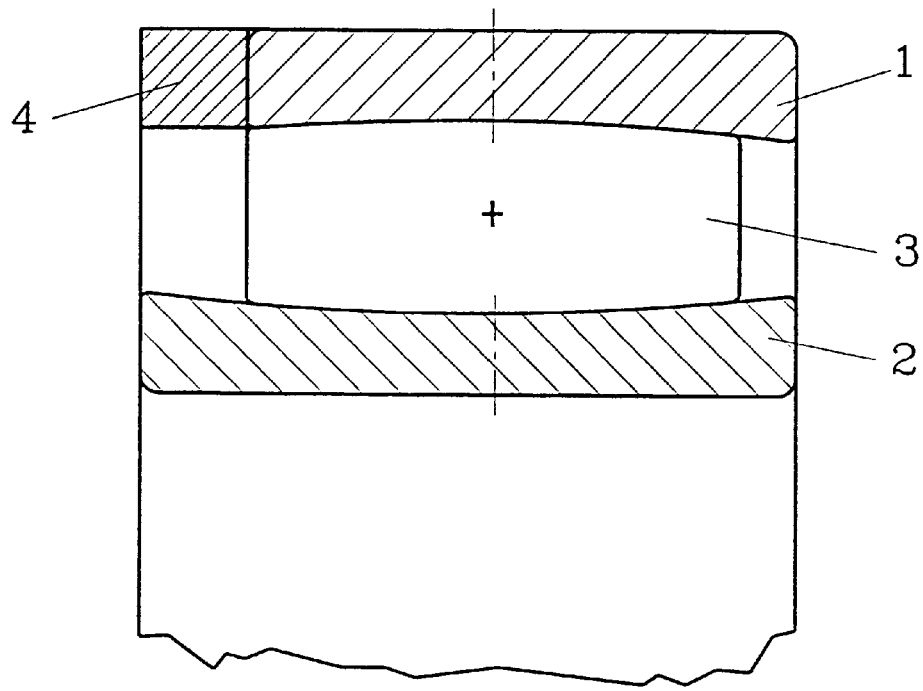
FIGS. 3a and 3b illustrate use of spacing washers at opposite side faces of the outer race ring.
Figure 3B:
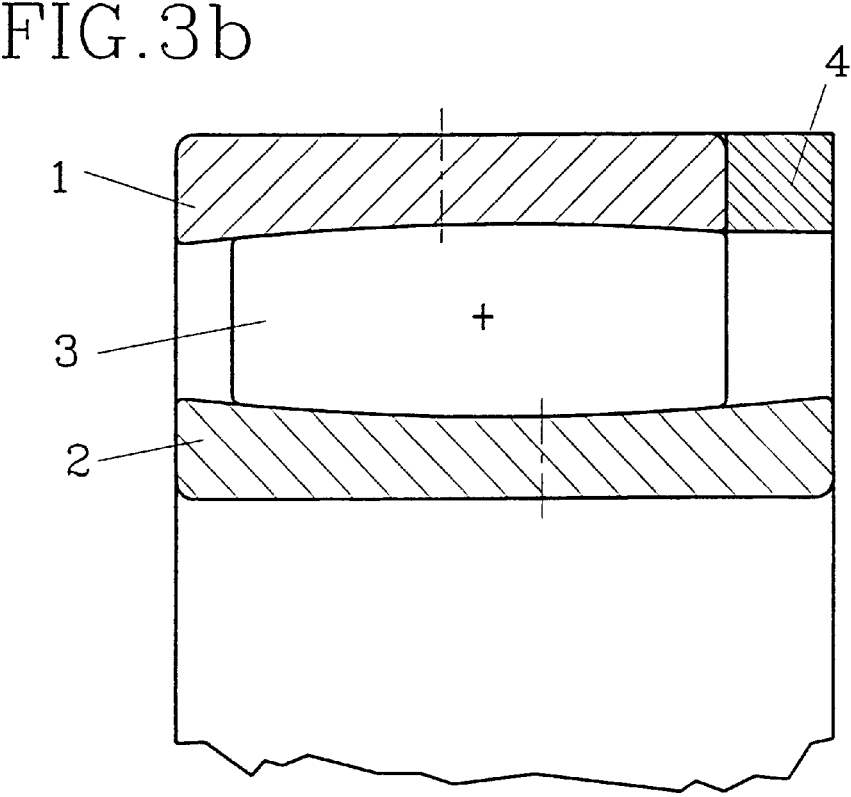

In another embodiment shown in FIGS. 3a and 3b there is used a separate spacer washer 4, which by being positioned against either axial end face of the race ring can adjust the mutual axial relation between the race rings thus that different, predetermined clearances can be obtained by shifting the washer 4 from one side to the other. Although shown only at the outer race ring, similar clearance adjustment effects may be obtained by positioning a washer at the inner race ring.

Figure 4A:
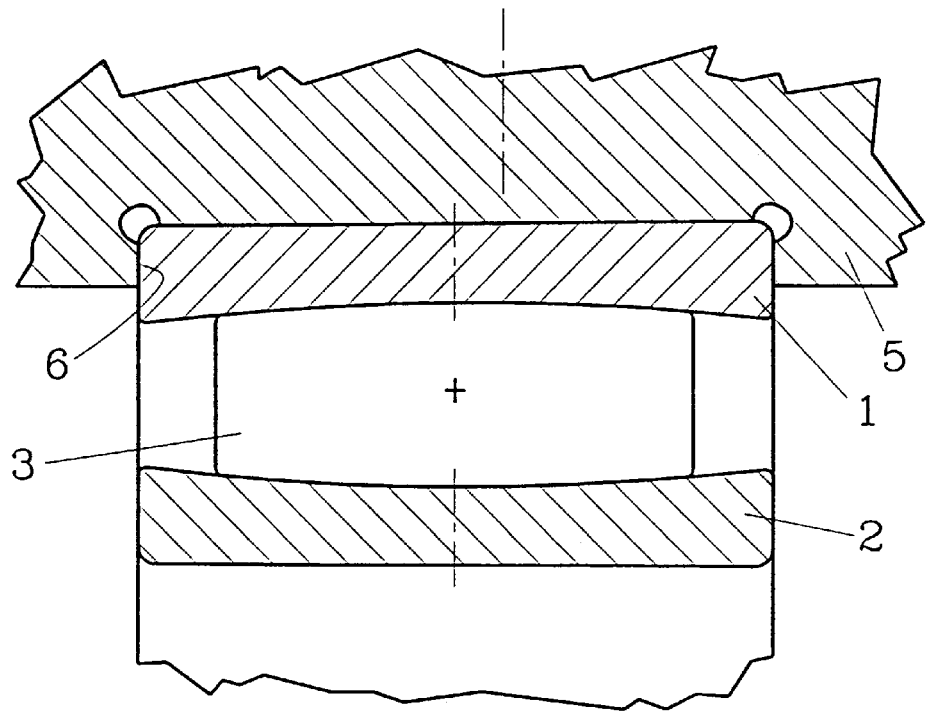
Figure 4B:
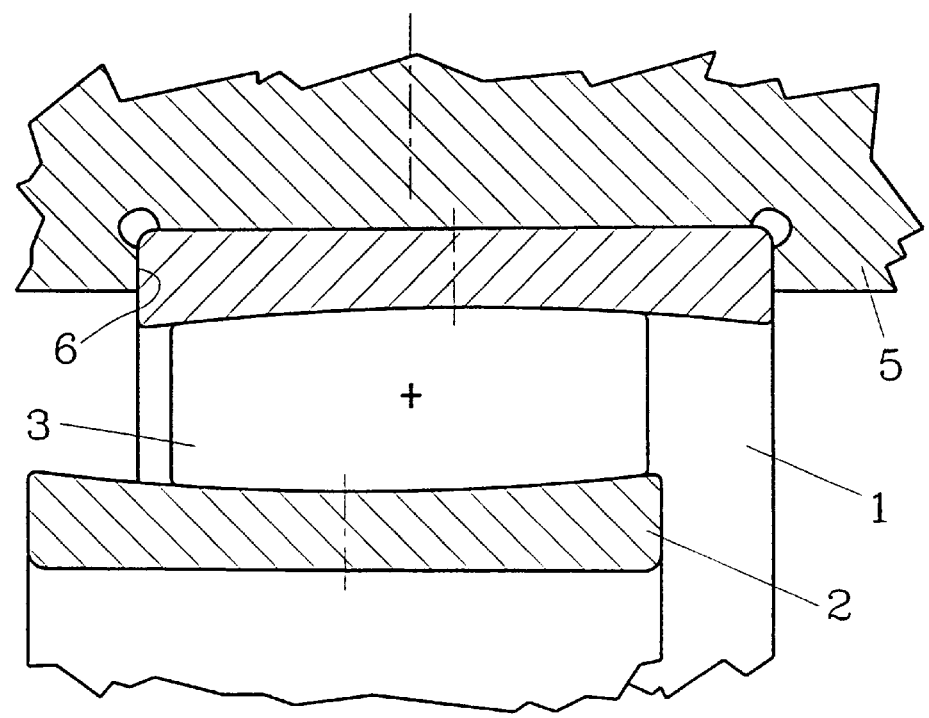

In still another embodiment illustrated in FIGS. 4a and 4b a similar axial displacement between the race rings and thereby an adjustment of the internal clearance can be obtained by using a split bearing housing, where the removable housing half 5 has a non-centred bearing seat 6 in which the outer race ring 1 is received. By turning the removable bearing housing half 5 in opposite axial directions it is possible to make the same type of clearance adjustments as in the embodiments previously shown and described.

As stated above it is also possible to combine e.g. the embodiments according to FIGS. 2 and 3 or FIGS. 2 and 4, thereby making it possible to obtain a larger number of clearance adjustment positions.

In FIG. 5 is illustrated an outer race ring 1 of a bearing inserted with loose fit in a schematically illustrated bearing housing 5', and supporting a shaft 7. The outer envelope surface of the outer race ring 1 is provided with a guide means in the form of a helical groove 8, which is arranged to cooperate with a means projecting from the housing in the form of a set screw 10. This set screw 10 engages in the helical groove 8 and causes the outer race ring 1 to move axially, if the race ring is rotated relative to the housing, thereby causing adjusting of the internal clearance of the bearing in a simple manner. For arresting the race ring in a desired position, there is provided in the bottom of the helical groove a series of spaced apart indentations 9 or the like. By tightening the set screw 10 its tip can be caused to engage one of these indentations 9, thereby arresting the race ring in a position resulting in a desired internal clearance. For facilitating of the rotation of the outer race ring 1 relative to the housing 5', the side face of the ring 1 may be recessed 11 for engagement with a tool for rotating the ring.

Although the drawings and the description have referred to one type of bearing, the method according to the invention can be used for different self-aligning bearings having contact angles close to 0°, as mentioned above. The invention is neither limited to the embodiments shown and described but can be varied and modified within the scope of the accompanying drawings. It thus is possible to provide the guiding means in the inner envelope surface of the inner race ring, and using a projecting means in form of a projecting nib fitted to the shaft and cooperating with said guiding means for effecting axial displacement of the inner race ring.

We claim:

1. Method for clearance adjustment in a single row adjustable rolling bearing having only a single inner race ring provided with only one race track forming a first race track and only a single outer race ring provided with only one race track forming a second race track, comprising positioning a plurality of rollers in a single row between and in contact with said first race track of the single inner race ring and said second race track of the single outer race ring, each race track being made in one piece, said rollers and race tracks having longitudinal section profiles which each possess a radius of curvature, the rollers and the first and second race tracks having substantially the same radius of curvature, said rollers thereby being axially moveable between the race tracks without being hindered by axial limitations at the race tracks, in order to allow relative misalignment and axial displaceability of the race tracks, the step of positioning the rollers involving positioning the rollers between the first and second race tracks such that the centers of the radii of curvature of the first and second race tracks of the inner and outer race rings are axially displaced relative to each other.

2. A method a claimed in claim 1, wherein the radius of curvature of the longitudinal section profiles of said rollers and outer race track is bigger than a distance between the outer race track and the axis of the bearing, as measured perpendicularly to the outer race track.

3. A method as claimed in claim 1, wherein the axial displacing of the race rings is achieved by using one bearing race ring manufactured with its center displaced from a position halfway between opposite ends of the one race ring, and mounting said one race ring in either of a first relation and a second relation, in which in said second relation said one race ring is mounted in reversed axial direction, allowing a single bearing to provide compensation for axial expansion with positive or negative direction.

4. A method as claimed in claim 1, wherein the axial displacing of the race rings is achieved by using at least one bearing race ring manufactured with its center displaced from a position halfway between opposite ends of the one race ring, and mounting said one race ring in either of a first relation and a second relation, in which in said second relation said one race ring is mounted in reversed axial direction, allowing a single bearing to cover two different clearance classes.

5. A method as claimed in claim 4, wherein axial displacement of the race rings is achieved by mounting at least one removable spacer washer against one end face of one of the race rings, thereby adjusting the bearing clearance to cover several different clearance classes.

6. A method as claimed in claim 1, wherein the axial displacement of the race rings is achieved by positioning the bearing in a split bearing housing having a bearing seat disposed in a non-centered position in a removable half of the bearing housing, and positioning the removable bearing housing half in either of a first position with a first axial direction and a second position having an oppositely reversed axial direction, thereby adjusting the bearing received in the bearing housing to two different internal clearances.

7. A method as claimed in claim 6, wherein axial displacement of the race rings is achieved by mounting at least one removable spacer washer against one end face of one of the race rings thereby adjusting the bearing clearance to cover several different clearance classes.

8. A method as claimed in claim 1, including positioning the bearing in a bearing housing, the outer race ring of the bearing being provided with a guide extending helically along an envelope surface of the outer race ring, and the bearing housing being provided with a projection that engages the guide, thereby causing axial displacement of the one race ring, as a result of cooperation between said guide and said projection.

9. A method as claimed in claim 8, wherein arresting means are provided in connection to said guide for causing arresting of said outer race ring in different mutual positions between said guide and said projection.

10. A method as claimed in claim 9, wherein the guide is a groove and a series of spaced indentations are provided in a bottom of the helical groove for arresting the outer race ring in different axial positions in relation to a confronting surface of the housing by causing said projection to project into one of said indentations.

11. A method as claimed in claim 8, wherein a helical groove is used as the guide, and a set screw extending through a wall of the bearing housing forms said projection.

12. A method as claimed in claim 1, wherein one of said race rings includes a guide, and including a projection that cooperates with said guide for effecting axial displacement of the one race ring.

13. A single row adjustable rolling bearing comprising a one piece inner race ring provided with a first race track, a one piece outer race ring provided with a second race track, and a plurality of rollers arranged in a single row between and in contact with said first and second race tracks, said rollers being axially moveable between the first and second race tracks without being hindered by axial limitations at the first and second race tracks, said first race track having a longitudinal section profile possessing a first radius of curvature, the first radius of curvature having a center, said second race track having a longitudinal section profile possessing a second radius of curvature, the second radius of curvature having a center, said first and second radii of curvature being substantially the same, the center of the first radius of curvature being displaced relative to the center of the second radius of curvature.

14. Adjustable rolling bearing as claimed in claim 13, wherein the center of the first radius of curvature is displaced relative to the center of the second radius of curvature by at least one removable spaced washer mounted against one end face of one of the inner and outer race rings.

15. Adjustable rolling bearing as claimed in claim 13, wherein the center of the first radius of curvature is displaced relative to the center of the second radius of curvature by a split bearing housing having a bearing seat disposed in a non-centered position.

16. Adjustable rolling bearing as claimed in claim 13, wherein the bearing possesses a bearing axis, the radius of curvature of the longitudinal section profiles of the rollers and the outer race track is greater than a distance between the outer race track and the bearing axis as measured perpendicularly to the outer race track.

17. Adjustable rolling bearing as claimed in claim 13, wherein one of said inner and outer race rings has a center that is displaced from a position halfway between opposite ends of said one race ring.

18. Method for clearance adjustment in a single row adjustable rolling bearing that includes a plurality of rollers located in a single row between and in contact with a first race track of a first race ring and a second race track of a second race ring, each race track being made in one piece, said rollers and race tracks having longitudinal section profiles which each possess a radius of curvature, the rollers and the first and second race tracks having substantially the same radius of curvature, said rollers thereby being axially moveable between the race tracks to allow relative misalignment and axial displaceability of the race tracks, said first race ring being positionable in a first position relative to the second race ring such that the centers of the radii of curvature of the first and second race tracks are axially displaced relative to each other to provide a first clearance between the first and second race tracks and said first race ring being positionable in a second position relative to the second race ring to provide a second clearance between the first and second race tracks that is different from the first clearance, the method comprising positioning the first race ring in the first position or the second position relative to the second race ring with the plurality of rollers located in a single row between and in contact with the first race track and the second race track to provide a single row adjustable rolling bearing having a desired clearance.

* * * * *